(12) United States Patent
Hanya

(10) Patent No.: US 7,625,456 B2
(45) Date of Patent: Dec. 1, 2009

(54) METHOD OF DESIGNING TREAD PATTERN HAVING THREE-DIMENSIONAL DESIGN UNITS

(75) Inventor: Masahiro Hanya, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/128,231

(22) Filed: Apr. 24, 2002

(65) Prior Publication Data

US 2002/0153077 A1    Oct. 24, 2002

Related U.S. Application Data

(63) Continuation of application No. 09/469,250, filed on Dec. 22, 1999, now abandoned.

(30) Foreign Application Priority Data

Dec. 28, 1998    (JP)    ................... 10-374841

(51) Int. Cl.
*B29D 30/00* (2006.01)
*B60C 11/03* (2006.01)
*B60C 11/13* (2006.01)
*G06F 17/50* (2006.01)

(52) U.S. Cl. .............. 156/110.1; 152/209.2; 152/209.3; 152/209.24; 703/1; 703/6; 703/8

(58) Field of Classification Search .............. 152/209.2, 152/209.3, 209.24; 156/110.1; 703/1, 6, 703/7, 8

See application file for complete search history.

(56) References Cited

U.S. PATENT DOCUMENTS

| | | | | |
|---|---|---|---|---|
| 5,120,209 A | * | 6/1992 | MacMillan | ................... 425/46 |
| 5,205,879 A | | 4/1993 | Seitz et al. | |
| 5,234,326 A | * | 8/1993 | Galli et al. | ..................... 425/46 |
| 5,394,916 A | * | 3/1995 | Williams | ................. 152/209.2 |
| 5,617,341 A | * | 4/1997 | Nakajima | |

(Continued)

FOREIGN PATENT DOCUMENTS

DE    4026486    *    2/1992

(Continued)

OTHER PUBLICATIONS

Translation for Japan 01-314620 dated Mar. 20, 2009.*

*Primary Examiner*—Steven D Maki
(74) *Attorney, Agent, or Firm*—Birch, Stewart, Kolasch & Birch, LLP

(57) ABSTRACT

A vehicle tire includes a tread provided with a tread pattern, which is made up of circumferentially arranged design units having a plurality of pitch lengths $Pi$ ($i=1$ to $j$) including a minimum pitch length $P1$ and a maximum pitch length $Pj$. Each of the design units has at least one groove with side walls each having an inclination angle $\alpha i$ in a cross section parallel to the tire equator, and the inclination angle $\alpha 1$ in the design unit having the minimum pitch length $P1$ is less than the inclination angle $\alpha j$ in the design unit having the maximum pitch length $Pj$, whereby the rigidity difference between the design units having different pitch lengths is decreased. Preferably, the angle $\alpha i$ in a design unit having a pitch length $Pi$ is not more than the angle $\alpha i+1$ in a design unit having the next longer pitch length $Pi+1$.

3 Claims, 5 Drawing Sheets

U.S. PATENT DOCUMENTS

| | | | |
|---|---|---|---|
| 5,710,718 A * | 1/1998 | Kamegawa et al. | |
| 5,759,312 A * | 6/1998 | Wesolowski | 152/209.2 |
| 6,230,112 B1 * | 5/2001 | Ishiyama | |
| 6,352,091 B1 * | 3/2002 | Hanya | |
| 6,531,012 B2 * | 3/2003 | Ishiyama | 156/110.1 |
| 2004/0118494 A1 * | 6/2004 | Liederer | 152/209.3 |

FOREIGN PATENT DOCUMENTS

| | | | |
|---|---|---|---|
| EP | 268436 | * | 5/1988 |
| EP | 0591002 A2 | | 4/1994 |
| EP | 0940271 A2 | | 9/1999 |
| JP | 61-144310 | * | 7/1986 |
| JP | 6357304 A | | 3/1988 |
| JP | 1-314610 | * | 12/1989 |
| JP | 2109705 A | | 4/1990 |
| JP | 4244402 A | | 9/1992 |
| WO | WO98/29270 | * | 7/1998 |

* cited by examiner

METHOD OF DESIGNING TREAD PATTERN HAVING THREE-DIMENSIONAL DESIGN UNITS

This application is a continuation of application Ser. No. 09/469,250, filed on Dec. 22, 1999 now abandoned, the entire contents of which are hereby incorporated by reference and for which priority is claimed under 35 U.S.C. § 120; and this application claims priority of Application No. 10-374841 filed in Japan on Dec. 28, 1998 under 35 U.S.C. § 119.

BACKGROUND OF THE INVENTION

The present invention relates to a vehicle tire having an improved tread portion in which the rigidity difference between the tread pattern design units having different pitch lengths is decreased to improve the tire uniformity, steering stability and the like.

In general, a pneumatic tire is provided in the tread with a tread pattern formed by repeating a design unit along the circumference of the tire, and most of the tread patterns employ variable pitches in arranging the design unit.

If the circumferential widths of grooves in every design unit are varied in proportion to the pitches, the sea/land ratio or the ratio of the grooved area to the remaining area is evened through all the design units, and as a result the ground pressure distribution of the tire becomes uniform. Thus this does not seem to involve problems. In fact, however, it is difficult to improve the tire uniformity, running noise, steering stability and the like. Therefore, the present inventor studied and found that the pattern rigidity of the design unit is not always evened although the ground pressure distribution is evened.

It is therefore an object of the present invention to provide a pneumatic tire in which the design units are evened in the pattern rigidity to improve the tire uniformity, steering stability, running noise and the like without worsening the ground pressure distribution.

SUMMARY OF THE INVENTION

According to the present invention, a vehicle tire comprises a tread provided with a tread pattern, the tread pattern made up of circumferentially arranged design units, the design units having a plurality of pitch lengths Pi (i=1 to j) including a minimum pitch length P1 and a maximum pitch length Pj, each of the design units comprises at least one groove having side walls each having an inclination angle $\alpha i$ in cross section parallel to the tire equator, and the inclination angle $\alpha 1$ in the design unit having the minimum pitch length P1 is less than the inclination angle $\alpha j$ in the design unit having the maximum pitch length Pj.

DESCRIPTION OF PREFERRED EMBODIMENTS

An embodiment of the present invention will now be described in detail in conjunction with the accompanying drawings.

FIGS. 3(A)-3(E) are cross sectional views showing the inclination angles of groove side walls at corresponding positions of design units having different pitch lengths.

Figure 4:
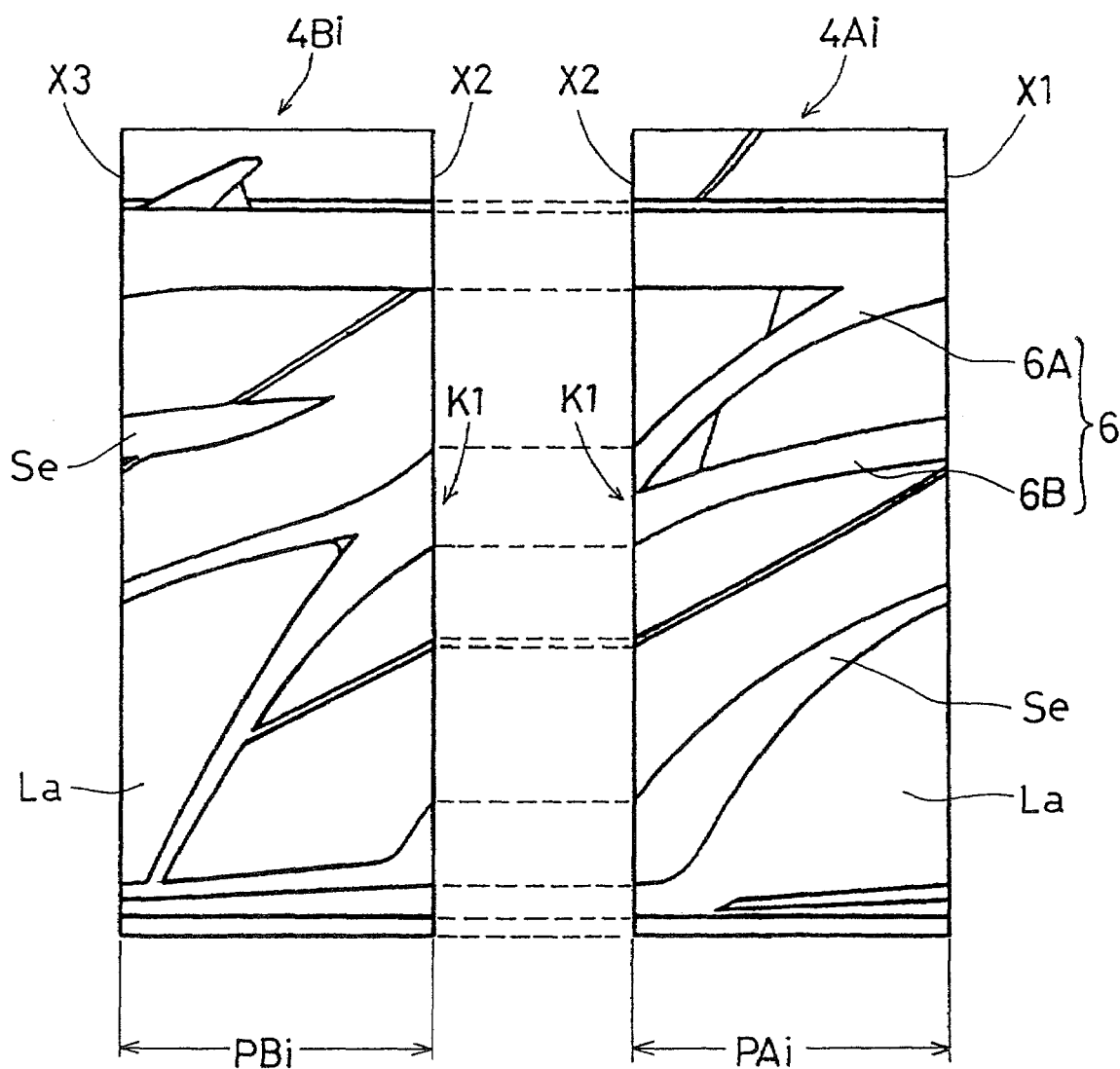

FIG. 4 shows parts of a tire vulcanizing mold corresponding to the design unit.

Figure 5:
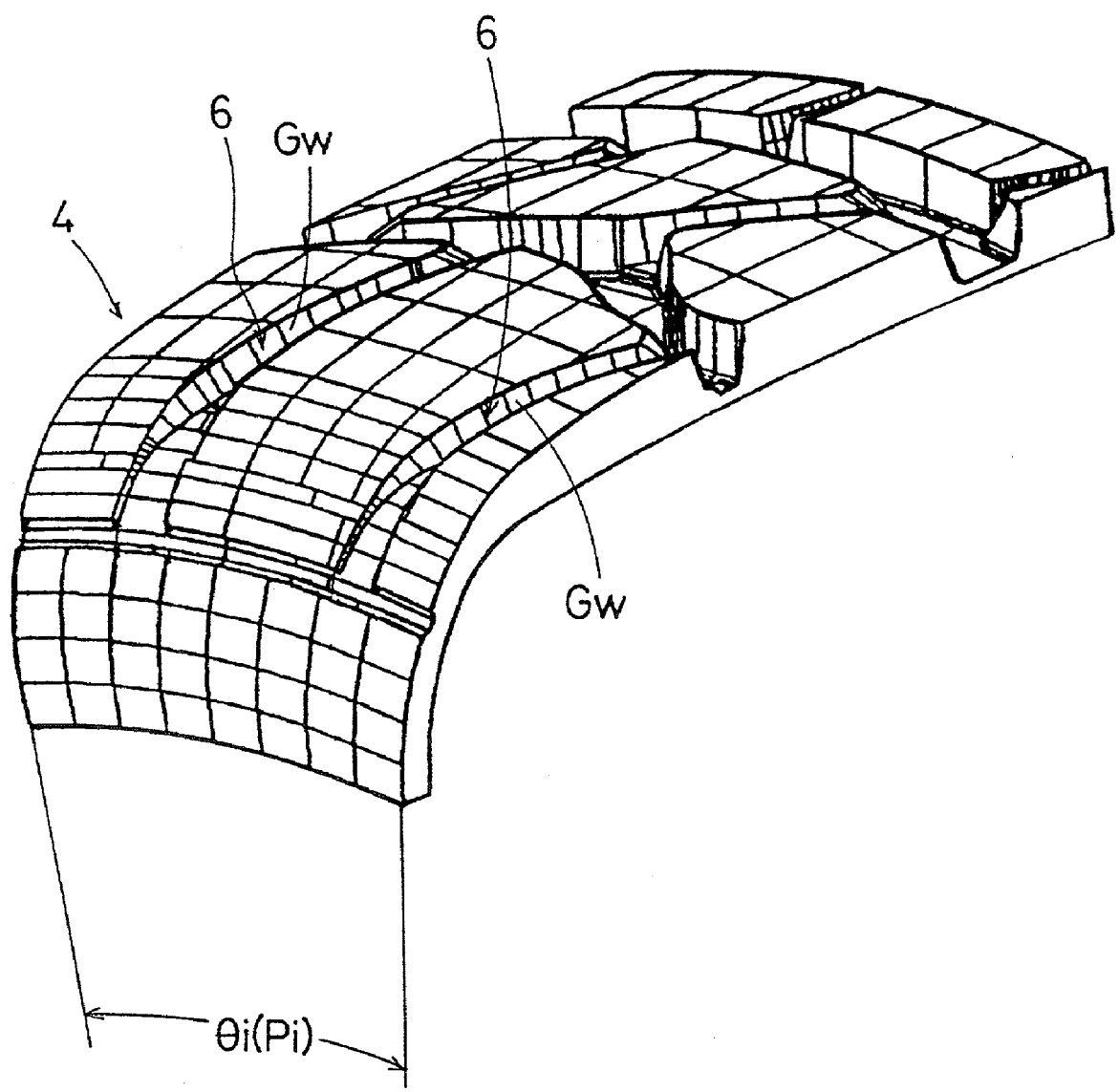

FIG. 5 is a diagram for explaining a method of making 3-D design units having different pitches.

In the drawings, a vehicle tire 1 according to the present invention is a pneumatic tire for passenger cars. The pneumatic tire has a tread portion, a pair of axially spaced bead portions, and a pair of sidewall portions extending therebetween. The pneumatic tire is reinforced by a bead core disposed in each bead portions, a carcass extending between the bead portions through the tread portion and sidewall portions, and a belt disposed radially outside the carcass in the tread portion.

The tread 2S is thus, divided by the tread grooves 3 and optional circumferential grooves 5 into land portions La defining a tread pattern.

Figure 1:
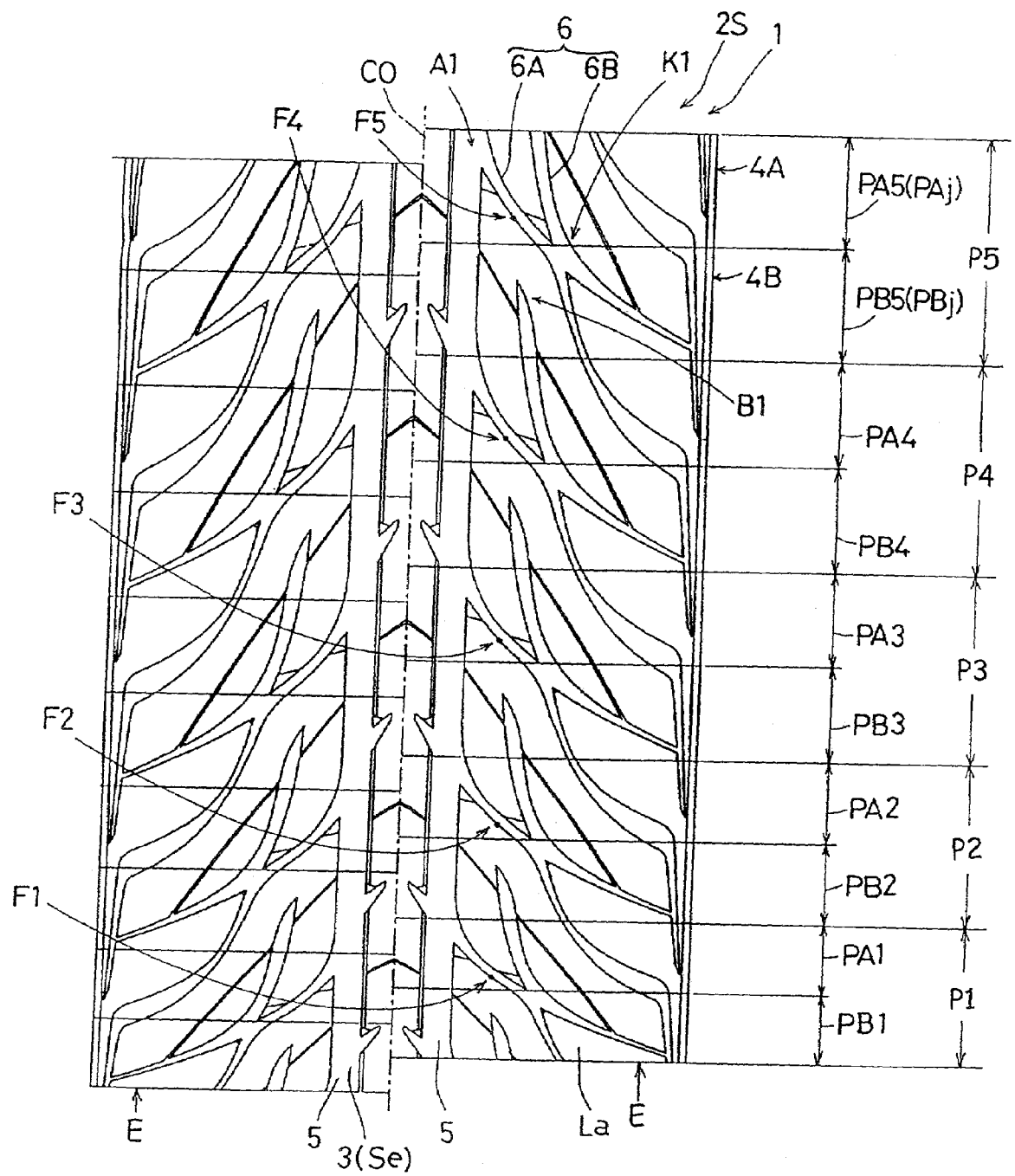
FIG. 1 shows a tread pattern according to the present invention.

Here, the tread grooves 3 do not include a circumferential groove extending substantially parallel with the tire circumferential direction in its entire length. However, this does not mean to exclude such circumferential groove from the tread 2S. In fact, the tread 2S shown in FIG. 1 is provided with continuous circumferential grooves 5.

The tread 2S is thus, divide by the tread grooves 3 and optional circumferential grooves 5 into land portions La defining a tread pattern.

The tread pattern is formed by repeating a design unit 4 along with circumference of the tire at variable pitches. To be exact, the tread pattern is formed by arranging, in a predetermined sequence, design units 4 which are identical with each other except for the circumferential lengths or pitch lengths Pi, wherein i is a suffix number from 1 to j, j is the number of different pitches, and the suffix number is given in ascending order of the pitch length.

Thus, P1 is the minimum pitch, and Pj is the maximum pitch.

In the tread pattern shown in FIG. 1, the design units 4 have five pitch lengths P1-P5.

Figure 2:
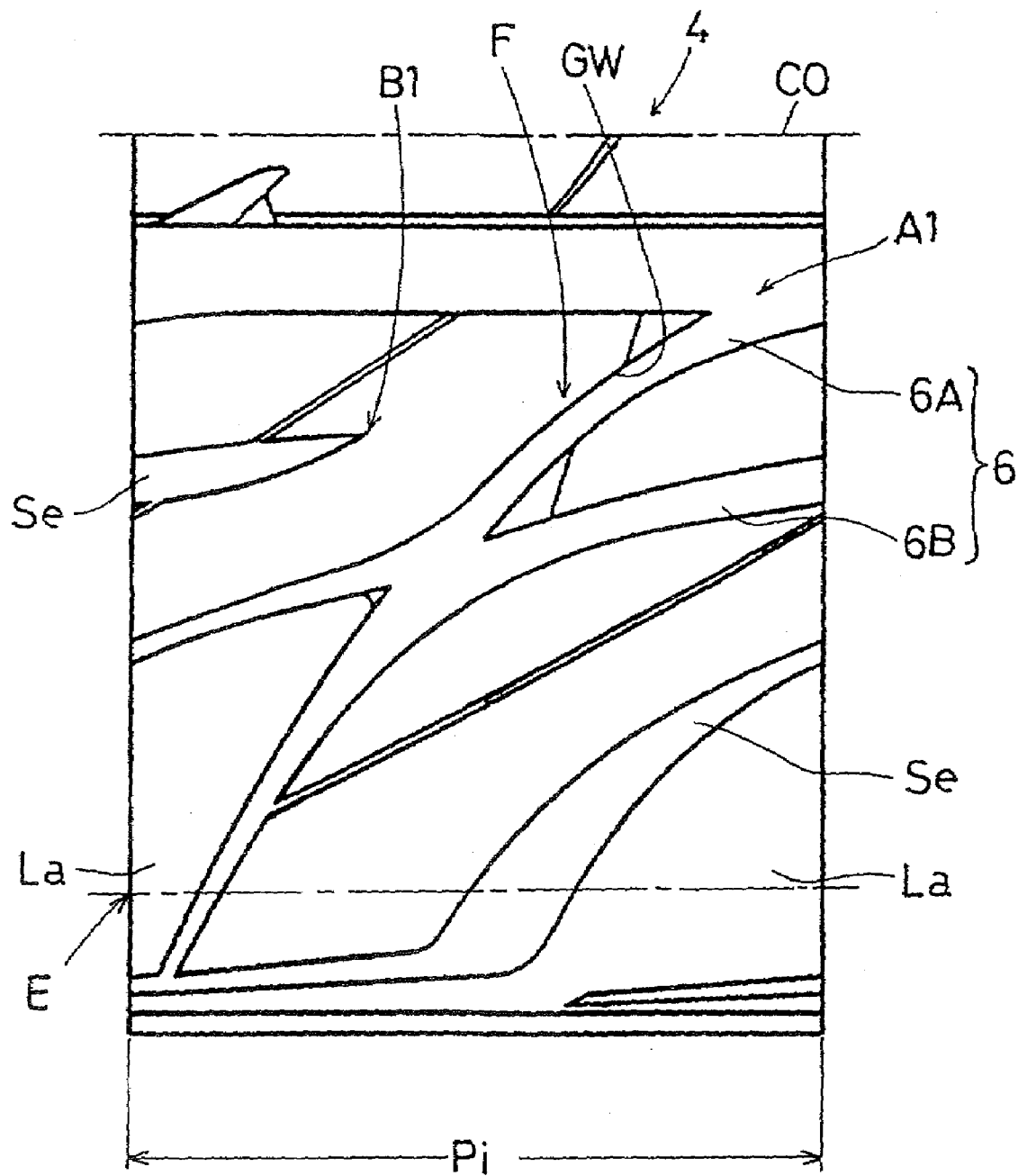
FIG. 2 shows a design unit forming the tread pattern.
Figure 3A:
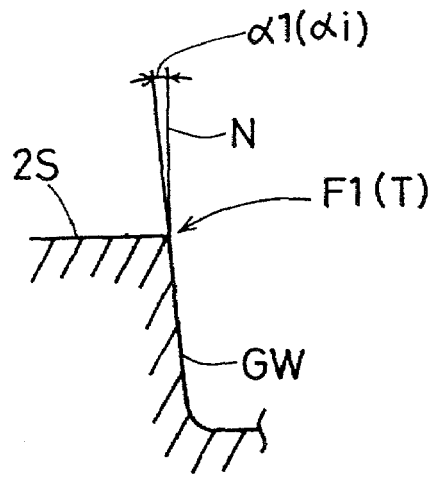
Figure 3B:
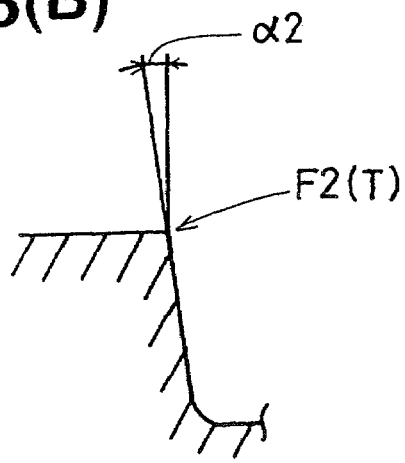
Figure 3C:
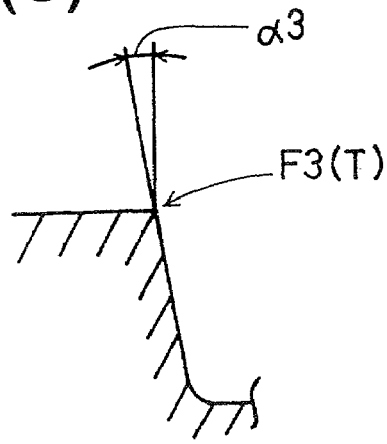
Figure 3D:
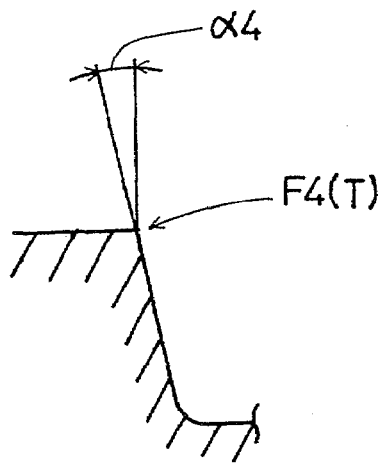
Figure 3E:
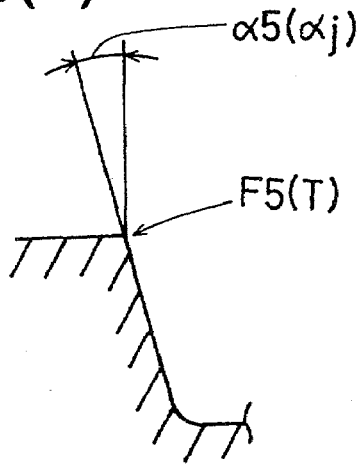

The design units 4 having variable pitches Pi are made by elongating or shrinking a basic design unit only in the tire circumferential direction. FIG. 2 shows an example of such a basic design unit 4. Accordingly, all the design units 4 have a substantially constant sea/land ratio, wherein the sea/land ratio is defined as the ratio Se/La of the sea area or grooved area Se to the total area La of the land portions La in each design unit. Thereby, the ground pressure distribution is evened through the tread 2S.

In a design unit having a pitch length Pi, the side walls Gw of a tread groove 3 have an inclination angle $\alpha i$ in a cross section parallel to the tire equator CO.

As shown in FIG. 3, the inclination angle $\alpha i$ is defined with respect to a normal line N to the tread 2S drawn at an intersecting point T between the side wall Gw and tread 2S. The suffix number i corresponds of that of the pitch length Pi.

According to the present invention, the angle $\alpha i$ at any position Fi in a design unit having a pitch length Pi is set to be less than the angle $\alpha i'$ at the corresponding position Fi' in a design unit 4 having a longer pitch length Pi' wherein i'>i.

Thus it must be satisfied that the angle $\alpha 1$ at any position F1 in the design unit having the minimum pitch length P1 is less than the angle $\alpha j$ at the corresponding position Fj in the design unit having the maximum pitch length Pj.

Preferably, it is satisfied that the angle $\alpha i$ at any position Fi in a design unit having a pitch length Pi is less than the angle $\alpha i+1$ at the corresponding position Fi+1 in a design unit 4 having a next longer pitch length Pi+1.

In FIG. 1, for example, as to the corresponding positions F1-F5 of the design units having the pitch lengths P1-P5, the angles α1-α5 thereat satisfy the following relationship:

$$\alpha 1 < \alpha 5$$

at least, preferably $$\alpha 1 < \alpha 2 < \alpha 3 < \alpha 4 < \alpha 5$$

as shown in FIG. 3.

More preferably, the angles αi are set in proportion to the pitch lengths Pi. That is, in this example, the following relationship is substantially satified:

$$\alpha 1 : \alpha 2 : \alpha 3 : \alpha 4 : \alpha 5 = P1 : P2 : P3 : P4 : P5.$$

Further, it is also possible to arrange the angles αi to satisfy the following two conditions:

$$\alpha 1 < \alpha 5$$

and $$\alpha 1 =< \alpha 2 =< \alpha 3 =< \alpha 4 =< \alpha 5.$$

Therefore, the difference in pattern rigidity between design units having different pitch lengths is decreased, and as a result, the tire uniformity, vibrations, running noise, steering stability and the like can be improved.

In any case, it is preferable that the side walls of a groove are inclined at an angle in the range of 1 to 20 degrees in a cross section orthogonal to the longitudinal direction of the groove.

In the example shown in FIG. 1, a circumferential groove 5 extending continuously in the tire circumferential direction is provided near and on each side of the tire equator CO. And slant grooves 6 are provided as the tread grooves 3. The slant grooves 6 include slant grooves 6A and slant grooves 6B. The slant grooves 6A extend from the tread edges E to the circumferential grooves 5. Each slant groove 6B extends axially inwardly from one of the tread edges E and intersects one of the slant grooves 6A and then terminates before the circumferential groove 5. Further, a rib which is formed between the two circumferential grooves 5 is provided on both sides thereof with notches positioned on extension lines of the slant grooves 6A. Further, there are provided narrow and shallow grooves extending from the tire equator CO towards both sides in V-shape. Thus the rib is substantially continuous in the tire circumferential direction. Except for the circumferential grooves 5, all the grooves are inclined to one circumferential direction if traced from the tread edges to the tire equator CO. The tread pattern is thus a unidirectional pattern.

Comparison Tests.

Based on the tread pattern shown in FIG. 1, test tires of size 235/45ZR17 (wheel rim 17X8JJ) were made and tested for the steering feeling, ride comfort, pattern noise, and uniformity. All the tires had the same pitch ratio
P1:P2:P3:P4:P5=75:88:100:113:125.

The specifications and test results are shown in Table 1. In Table 1, the angles α1-α5 are indicated by an index based on the angle α3 being 100.

1) Steering Feeling Test

During running a 2500 cc FR passenger car provided on all the four wheels with test tires on an asphalt road in a tire test course, the test driver evaluated the steering response, stability and road grip into ten ranks. The larger the rank, the better the performance.

2) Ride Comfort Test

During running the test car on various rough roads in the tire test course, the test driver evaluated the ride comfort into ten ranks. The larger the rank, the better the performance.

3) Pattern Noise Test

The test car was coasted on a smooth asphalt road at a speed of 50 km/h, and the noise in dB(A) was measured near the driver's right ear. In Table 1, the results are indicated as the difference from Ref.3.

4) Uniformity Test

According to JASO-C607, RFV and TFV were measured. In Table 1, the results are indicated as the difference from Ref. 3. The smaller the value the better the uniformity.

TABLE 1

| Tire | Ex. 1 | Ex. 2 | Ex. 3 | Ref. 1 | Ref. 2 | Ref. 3 |
| --- | --- | --- | --- | --- | --- | --- |
| Side wall angle | | | | | | |
| α1 | 95 | 87 | 80 | 110 | 105 | 100 |
| α2 | 98 | 95 | 90 | 105 | 103 | 100 |
| α3 | 100 | 100 | 100 | 100 | 100 | 100 |
| α4 | 103 | 105 | 110 | 95 | 100 | 100 |
| α5 | 105 | 109 | 120 | 90 | 100 | 100 |
| Steering | 7 | 7 | 8 | 5 | 6 | 6 |
| Ride Comfort | 6 | 6 | 7 | 6 | 6 | 6 |
| Noise (dB) | −0.5 | −0.7 | −1.1 | 0.3 | 0.2 | 0 |
| Uniformity | | | | | | |
| RFV (kgf) | −0.3 | −0.5 | −0.8 | 0.3 | 0.3 | 0 |
| TFV (kgf) | −3.4 | −4.1 | −5.7 | 3.6 | 2.4 | 0 |

On the other hand, the pneumatic tire is vulcanized in a mold. The mold comprises segments or parts for shaping the tread portion. The radially inner surfaces thereof are provided with the negative tread pattern. FIG. 4 shows a pair of segments 4A$i$ and 4B$i$ respectively provided with one half and other half of a design unit 4. The paired segments 4A$i$ and 4B$i$ have the same half pitch PA$i$, PB$i$ (=P$i$/2) of the design unit 4. As mentioned above, the design units having variable pitches P$i$ are made by elongating or shrinking a basic design unit 4 only in the tire circumferential direction. Therefore, by dividing along the circumferential center line of the design unit 4, in a sequence of the design units forming a tread pattern, the segments 4A$i$ becomes interchangeable and also the segments 4B$i$ becomes interchangeable. For example, in a mold for the tire shown in FIG. 1, as the number of the design units is five, the segments 4A1-4A5 having pitches PA1-PA5 and the segments 4B1-4B5 having pitches PB1-PB5 are arranged in the order shown. This order is however only an example. To make or try another pitch sequence, it is possible to interchange PB1 and PB2, PB2 and PB3, PA3 and PA4, PA1 and PA3 - - - and the like. Thus, by the minimum segments, pneumatic tires having various pitch sequences can be made. Incidentally, when the tread pattern is unidirectional as shown in FIG. 1, the segments are not interchangeable between the right side and left side of the tire equator.

The above-mentioned tread pattern and design unit are on the tread 2S, that is, it is regarded as two dimensional. However, FIG. 5 shows a wire frame model of a 3-D basic design unit drawn by a computer to design a tread pattern. In the case of a 3-D design unit, as the dimensions in the radial direction of the tire are also considered, by simply changing the pitch angle θi of the basic design unit, design units having different pitches in which the inclination angles meet the above-mentioned conditions can be made easily.

The invention claimed is:

1. A method of making a tread pattern for a vehicle tire, comprising:

making a three-dimensional basic design unit having a radially inward extent and a pitch length Pi, said three-dimensional basic design unit including at least one slant groove having side walls each having a certain inclination angle $\alpha_i$ in a cross section parallel to the tire equator, making a number (j) of three-dimensional design units having different pitch lengths Pi (i=1 to j) by elongating or shrinking said three-dimensional basic design unit such that each of the three-dimensional design units elongates or shrinks only in the tire circumferential direction, whereby the number (j) of three-dimensional design units have geometrically identical patterns except that the inclination angle $\alpha_i$ in a design unit having a pitch length Pi is less than the inclination angle $\alpha_{i+1}$ in a design unit having the next longer pitch length $P_{i+1}$, and a circumferential width of each said at least one slant groove in each of the three-dimensional design units is varied in proportion to the pitch length of the design unit, and dividing at least two of the number (j) of three-dimensional design units having said geometrically identical patterns and different pitch lengths along the circumferential centerlines thereof each into two equal length parts, which are a first part and a second part having patterns different from each other, wherein a first portion of said at least one slant groove is located in said first part and the remaining portion of said at least one slant groove is located in said second part, interchanging a first part of one of the divided design units with a first part of another of the divided design units to form one regenerated design unit and another regenerated design unit respectively wherein said regenerated design units have said geometrically identical patterns, and arranging the three-dimensional design units including the regenerated design units around a tire axis to form a circumferentially continuous tread pattern.

2. The method according to claim 1, wherein the number (j) is more than three.

3. The method according to claim 1, wherein the number (j) is more than four.

* * * * *